(12) United States Patent
Nadler et al.

(10) Patent No.: US 6,588,897 B1
(45) Date of Patent: Jul. 8, 2003

(54) SAFETY EYEGLASSES FRAME

(75) Inventors: Joseph Nadler, Toronto (CA); Ryan J. Nadler, Toronto (CA)

(73) Assignee: No. 1308676 Ontario, Inc., Ontario (CA)

( * ) Notice: Subject to any disclaimer, the term of this patent is extended or adjusted under 35 U.S.C. 154(b) by 0 days.

(21) Appl. No.: 10/158,232

(22) Filed: May 31, 2002

(51) Int. Cl.$^7$ ................................................. G02C 5/00
(52) U.S. Cl. ......................................... 351/154; 351/86
(58) Field of Search ........................... 351/154, 86, 92, 351/95

(56) References Cited

U.S. PATENT DOCUMENTS

| | | | |
|---|---|---|---|
| 2,270,382 A | * 1/1942 | Nerney | 351/154 |
| 2,387,789 A | * 10/1945 | Williams | 351/174 |
| 4,196,982 A | 4/1980 | Watkins | |
| 4,921,341 A | * 5/1990 | Ace | 351/86 |
| 4,971,431 A | 11/1990 | Gerard | |
| 5,400,089 A | 3/1995 | Danloup et al. | |
| 5,862,529 A | 1/1999 | Moodie et al. | |
| 6,164,775 A | 12/2000 | Zider et al. | |

* cited by examiner

Primary Examiner—Huy Mai
(74) Attorney, Agent, or Firm—Nixon Peabody LLP; Thomas W. Cole

(57) ABSTRACT

An eyeglass frame particularly adapted for mounting a safety lens having a straight outer wall circumscribed by a groove is provided. The eyeglass frame includes a T-wire having a centrally disposed rib portion receivable in the lens groove, and a pair of oppositely extending rims flexibly cantilevered from the rib portion. Each of the rims includes a retaining wall that engages opposite ends of the outer wall of the lens in line contact. Each of the retaining walls is tapered relative to the outer wall of the lens so that the retaining walls can flex toward greater surface contact with the outer lens wall in response to hoop stresses generated by a shock to the lens, thereby increasing the amount of shock that the lens can absorb before becoming broken or dislodged from the T-wire of the frame.

16 Claims, 2 Drawing Sheets

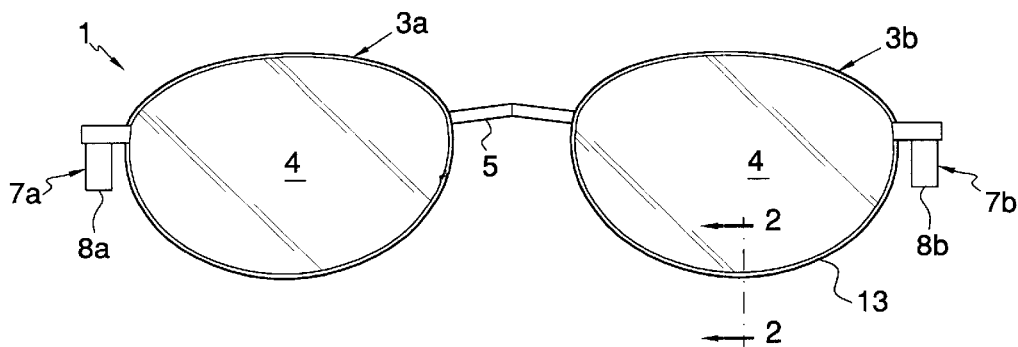
FIG.1A
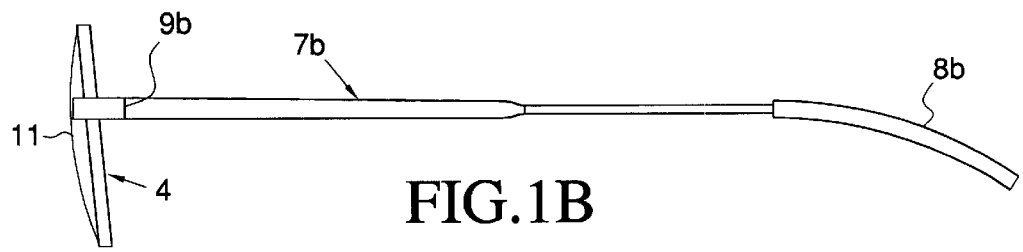
FIG.1B
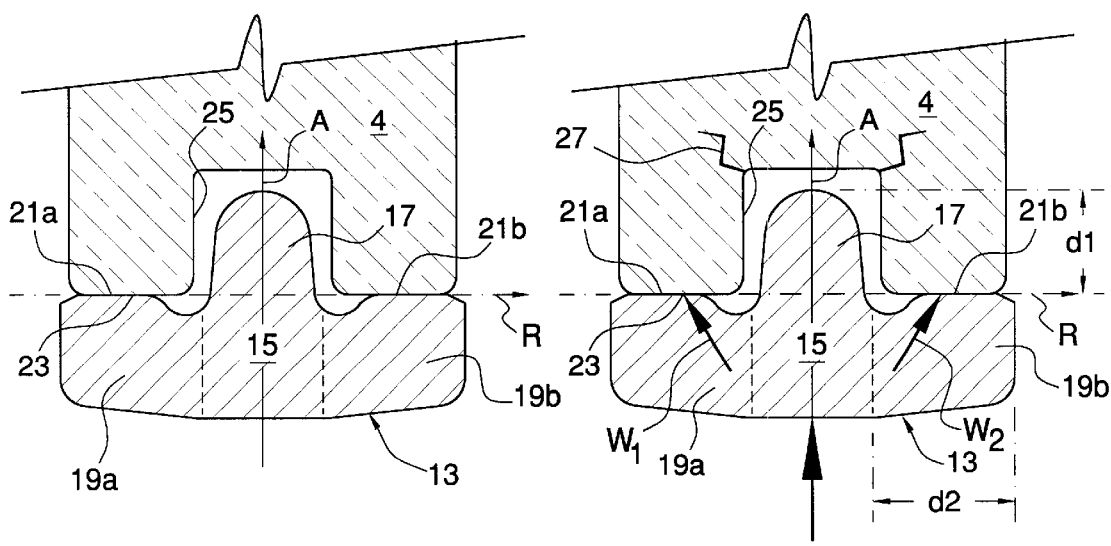
FIG.2A
PRIOR ART
FIG.2B
PRIOR ART

SAFETY EYEGLASSES FRAME

BACKGROUND OF THE INVENTION

This invention generally relates to eyeglass frames and is specifically concerned with an eyeglass frame having an improved shock absorbing T-wire for mounting a safety lens.

Safety eyeglass frames for mounting prescription lenses are known in the prior art. Like regular eyeglass frames, such safety frames generally comprise a pair of lens-retaining rims connected by a bridge which rests on the upper portion of the wearer's nose when the glasses are worn. Temples hingedly connected to the sides of the rims secure the lenses in front of the eyes of the wearer.

Safety eyeglasses differ from ordinary eyeglasses in that the lenses must effectively resist being dislodged from the rim in the event that a shock or impact force is applied onto the front surface of the eyeglass lenses. Consequently, prescription eyeglass rims formed from wire having a T-shaped cross-section were. adopted in the prior for use in safety glasses. Such T-wire rims include a rim portion having a centrally disposed, inner rib that protrudes upwardly from the inner rim surface at a right angle. The inner rib extends into a groove centrally disposed around a generally straight outer wall of the lens. The interfitting rib and groove arrangement creates a stronger connection between the lens and the surrounding rims, making it less likely that the lens will dislodge upon the application of an impact or shock force.

While such prior art T-wire rims have generally worked well for their intended purpose, the applicant has noted that the conventional T-wire design is much more prone to failure when applied to thinner lenses. Recent advances in polycarbonate chemistry have led to transparent plastic materials which advantageously combine the properties of higher shock resistance, and a higher index of refraction. Such new plastics will soon allow the thickness of safety prescription lenses to be reduced to only 2 millimeters. While the use of such thinner lenses advantageously reduces the weight of the eyeglasses and enhances their overall appearance by giving them the trim, lightweight look of ordinary prescription glasses, it also results in a weakened connection between the T-wire and the outer edges of the lenses, and promotes the occurrence of cracking in the lens in the vicinity of the centrally-disposed groove. Surprisingly, the applicant has observed that such dislodgment and cracking are not caused solely by the reduced thickness of the lens in the vicinity of the lens-rim joint, but instead from the generation of hoop stresses between the outer surface of the lens and inner surface of the T-wire in response to a sharp impact force on the outer surface of the lens. The applicant has determined that such hoop stresses are caused by the generally convex profile of the front surface of lens, which is present even when it is non-prescription, in combination with the increased flexibility of the lens due to its smaller thickness. These two geometries increase the tendency of the outer walls of the lens to momentarily flex outwardly in a radial direction in response to shock in what may be termed an "oil can" effect. This momentary radial expansion in turn causes the T-wire to tighten so that the rim portions on either side of the rib of the T-wire momentarily apply powerful wedging forces to the groove that circumscribes the outer wall of the eyeglass lens. The resulting wedging forces between the T-wire and the lens groove may generate cracks at the end of the groove which may cause fracture and dislodgment of the lens in an accident situation. Even if the lens is not dislodged, the resulting fractures may necessitate replacement of the lens. The applicant has further observed that the increased tendency of such thinner lens to bend in response to shock or impact force can also result in slippage between the relatively short rib of the rims and the groove in the lens. Such slippage is another factor that can result in dislodgment of the lens from the rim.

Clearly, what is needed is an improved eyeglass frame having a T-wire rim which is capable of securely gripping the outer walls of an eyeglass lens during an accidental impact to the lenses without slippage, yet does not generate the wedging forces in the vicinity of the grooves circumscribing the lens that promote cracking and fracture. Ideally, the T-wire of the eyeglass frames should be compatible for use with lenses having a conventionally shaped straight outer walls circumscribed by a groove of conventional shape to obviate the need for new grinding or shaping techniques for safety lenses. Finally, it would be desirable if the T-wire of the frame were easily and inexpensively manufactured with existing machinery.

SUMMARY OF THE INVENTION

Generally speaking, the invention is an eyeglass frame for mounting a lens that overcomes the aforementioned shortcomings associated with the prior art. The eyeglass frame of the invention is particularly adapted for mounting a lens having a straight outer wall circumscribed by a groove, and comprises a T-wire including a centrally disposed rib portion receivable in the lens groove, and a pair of oppositely extending rims flexibly cantilevered from the rib portion. Each of the rims includes a retaining wall that engages opposite ends of the outer wall of the lens in line contact. Each of the retaining walls is shaped such that they flex toward the outer lens wall in response to momentary hoop stresses generated by shock to the lens in order to absorb the same.

In the preferred embodiment, the retaining walls of each of the oppositely extending rims are tapered at an angle between the rib portion and their outer edges. The taper angle of each of the retaining walls of the rims is preferably between about 10° and 20° relative to a line orthogonal to a central axis of the rib portion. When a momentary hoop stress is created by shock directed toward the front of the lens, each of the flexibly cantilevered rims flexes toward the lens, thereby reducing the taper angle and increasing surface contact between the outer edges of the retaining walls of the rims and the outer wall of the lens. After the shock abates, the cantilevered rims flex back into line contact with the lens.

To further increase the resistance of the frame to lens slippage when the lens is exposed to shock or impact forces, the rib portion includes a rib which projects from the rims a distance greater than the rims project from the rib portion. The depth of the groove is greater than the distance than the rib projects from the rims so that the distal end of the ribs does not come into contact with the bottom of the groove even during the application of shock to the lens. Sidewalls of the ribs are tapered with respect to the lateral walls of the groove to further eliminate the possibility of engagement and stress between the rib and the walls of the groove.

Finally, the joint between the rib portion and the cantilevered rims is rounded to facilitate flexible movement between these components.

BRIEF DESCRIPTION OF THE DRAWINGS

FIGS. 1A and 1B are front and side views of eyeglass frames of the invention;

FIG. 2A is a cross-sectional view of a conventional T-wire rim taken along the line 2—2 of FIG. 1A, illustrating how the T-wire interfits with the edge of a safety lens under normal circumstances;

FIG. 2B illustrates the eye wire of FIG. 2A under an accident condition wherein the front of the lens is subjected to a shock or impact force;

DETAILED DESCRIPTION OF THE INVENTION

Figure 3:
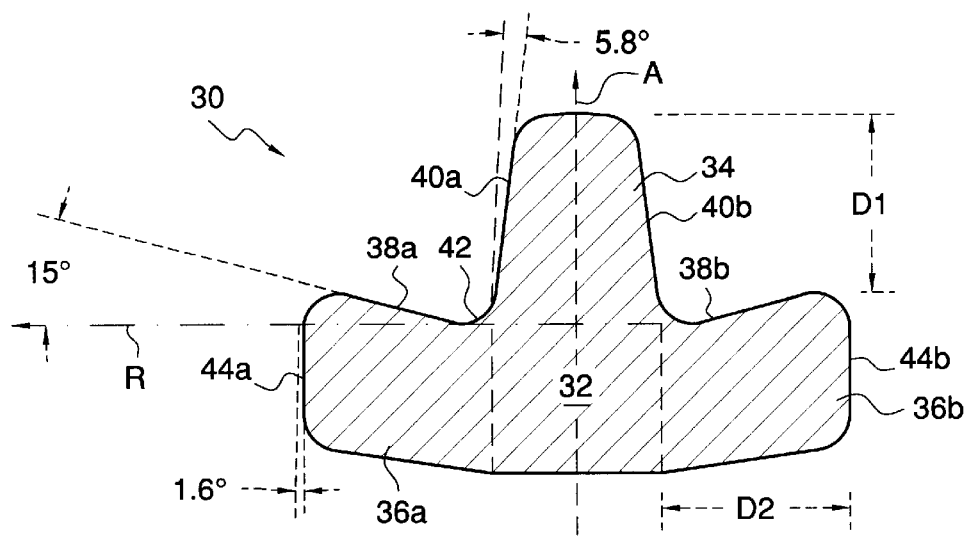
FIG. 3 is a cross-sectional view of the T-wire rim of the invention, showing in particular the taper angles of the lens-engaging inner walls of the rims.

With reference to FIG. 1A and FIG. 1B, wherein like numerals designate like components throughout all of the several figures, the new T-wire of the invention is adapted for use with a pair of safety eyeglasses 1 of the type having a pair of rim assemblies 3a, b circumscribing transparent safety lenses 4. The rim assemblies 3a, b are interconnected by means of a bridge 5 which rests on the upper portion of the wearer's nose during use. As is best seen in FIG. 1B, a pair of temples 7a, b terminating in ear pieces 8a, b are pivotally connected on either side of the rim assemblies 3a, b via hinges 9a, b. Each of the safety lenses 4 normally has a convex front portion 11, even when the safety lenses 4 are non-prescription. Lenses 4 may be formed from polycarbonate or any other safety lens material that resists shattering when exposed to shock.

FIGS. 2A and 2B illustrate the structure and operation of a prior art T-wire in safety eyeglasses such as the ones illustrated in FIGS. 1A and 1B. Such prior art T-wires 13 include a rib portion 15 which is symmetrically disposed around a central axis A. Rib portion 15 includes a rib 17 that protrudes upwardly from a line R disposed orthogonally to central axis A. Rims 19a, b extend along line R in opposite directions from the rib portion 15. Each of these rims 19a, b includes an engaging wall 21a, b which contacts the straight outer wall 23 of the lens 4 as shown. The lens 4 has a centrally disposed groove 25 for receiving the rib 17. With reference in particular to 2B, when a shock or impact is applied to the front surface 11 of the lens 4, the lens momentarily radially expands as a result of the convex shape of the lens front portion 11. This radial expansion in turn generates a hoop force between the prior art T-wire 13 which in turn creates wedging forces W1 and W2 between the engaging walls 21a, b of the rims 19a, b and the outside surfaces of the straight outer wall 23 of the lens. The resulting wedging forces W1 and W2 can generate cracks 27 at the bottom surface of the groove 25. These cracks 27 may in turn fracture the lens 4 and result in its dislodgment from the T-wire 13. Even if the lens 4 does not become dislodged, the resulting cracks 27 may necessitate lens replacement.

The T-wire 30 of the invention includes a centrally disposed rib portion 32 having a rib 34 that protrudes symmetrically along a centrally disposed axis A. A pair of rims 36a, b are cantilevered in opposite directions along a line R disposed orthogonally to the axis A. Each of the rims 36a, b includes a tapered engaging wall 38a, b as shown. While the engaging walls 38a, b may be tapered anywhere between 10° and 20° with respect to line R, the taper angle is 15° in the preferred embodiment. Additionally, the sides 40a, b of the rib 34 are slightly tapered at an angle of 5.8° with respect to the central axis A, although a taper angle of between 3° and 9° is encompassed within the scope of the invention. The oppositely extending rims 36a, b are integrally formed with the rib 34 via a rounded joint 42 in order to facilitate the flexing of these rims as is described in more detail hereinafter. The sides of the rims 44a, b are slightly tapered with respect to the axis A an angle of 1.6°, although angles of between 1° and 3° are also within the scope of the invention. Finally, it should be noted that the height D1 of the rib 34 is slightly greater than the length D2 that each of the rims 36a, b extends from the rib portion 32. Such proportioning enhances the resistance of the rims 36a, b to an unwanted slippage of the lens 4 from the T-wire 30, and contrasts substantially with the proportions of these dimensions in prior art T-wires 13, wherein the height d1 of the ribs 17 is substantially shorter than the length d2 that the rims 19a, b extend from the rib portion 15. The T-wire 30 is preferably formed from a strong, resilient metal, such as nickel, silver, or titanium alloys, or stainless steel.

Figure 4A:
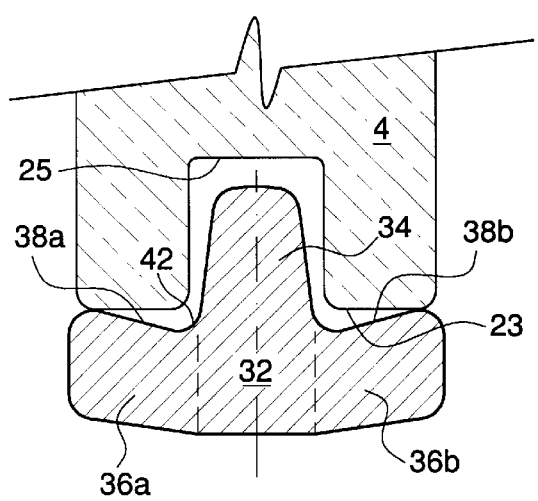
FIG. 4A illustrates the T-wire rim of FIG. 3 mounted around the outer wall of a safety lens under normal, non-impact conditions.
Figure 4B:
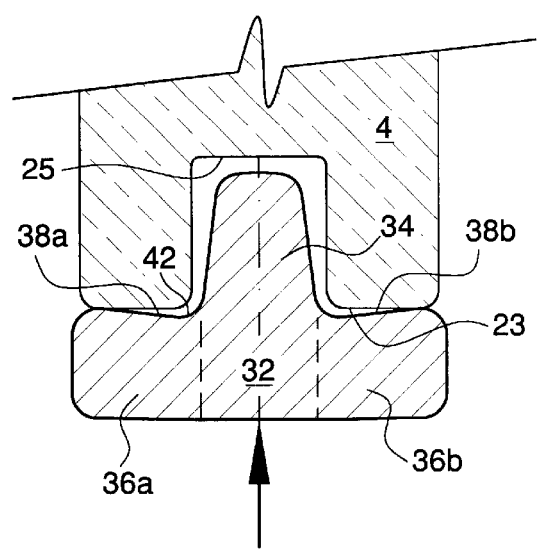
FIG. 4B illustrates the T-wire and safety lens of FIG. 4A under an accident condition wherein a shock or impact is applied to the front surface of the lens, and how the rims of the T-wire flex toward the lens outer wall in response to such impact.

FIGS. 4A and 4B illustrate the operation of the T-wire 30 in the event that a shock or impact is applied to the front portion 11 of the lens 4. FIG. 4A illustrates the interconnection between the T-wire 30 and a safety lens 4 under normal, non-impact conditions. The tapered engaging walls 38a, b contact the outer edges of the straight outer wall 23 of the lens in substantially line contact as shown, leaving V-shaped gaps between these walls 38a, b and the straight outer wall 23. However, when a shock or impact is applied to the front portion 11 of the lens 4, the cantilevered rims 36a, b flex upwardly as illustrated in FIG. 4B, reducing the V-shaped gaps and increasing surface contact between the tapered engaging walls 38a, b and the straight outer wall 23 of the lens 4. While the distal end of the rib 34 moves closer toward the bottom wall of the groove 25, it does not actually contact the groove 25 under such shock conditions. The rounded joint 42 between the opposing rims 36a, b and the rib portion 32 helps to facilitate the resulting shock-absorbing flexing action. The shock-absorbing operation of the inventive T-wire 30 advantageously eliminates the wedging forces associated with the prior art T-wire 13, and allows the safety lenses 4 to be subjected to even greater impact forces without fracture and without dislodgment from the rim.

While this invention has been described with respect to a single preferred embodiment, numerous additions and variations will become evident to persons of ordinary skill in the art. For example, other profiles of the engaging walls 38a, b may be adopted which would likewise result in advantageous shock-absorbing effects. The proportions and angles of the preferred embodiment could be varied while still realizing the shock-absorbing advantages of the invention. All such modifications, variations, and additions are intended to be encompassed within the scope of this patent, which is limited only by the claims appended hereto.

PARTS LIST

1. Safety eyeglasses
3. Rim assemblies a,
4. Safety lenses

5. Bridge
7. Temples a, b
8. Ear piece a, b
9. Hinges a, b
11. Convex front portions
13. T-wire
15. Rib portion
17. Rib
19. Rims a, b
21. Engaging walls a, b
23. Straight outer wall
25. Centrally disposed groove
27. Cracks
30. T-wire
32. Rib portion
34. Rib
38. Tapered engaging walls
40. Tapered sides of rib
42. Rounded joints
44. Sides of rims a, b

What is claimed is:

1. An eyeglass frame for mounting a lens having a straight outer wall circumscribed by a groove, comprising:

a T-wire including a centrally disposed rib portion receivable in said groove, and a pair of oppositely extending rims flexibly cantilevered from said rib portion, wherein each of said rims includes a retaining wall that engages opposite ends of said outer wall of said lens in line contact, and each of said retaining walls is shaped such that said retaining walls flex said outer lens wall in response to momentary hoop stresses generated by shock to said lens.

2. The eyeglass frame according to claim 1, wherein said retaining walls of said rims are tapered between said rib portion and their outer edges.

3. The eyeglass frame according to claim 2, wherein said retaining walls of said rims are tapered at an angle of between about 10° and 20° relative to a line orthogonal to a central axis of said rib portion.

4. The eyeglass frame according to claim 1, wherein said rib portion has a rib that projects from said rims for a distance greater than said rim projects from said rib portion.

5. An eyeglass frame for mounting a lens having a straight outer wall circumscribed by a groove, comprising:

a T-wire including a centrally disposed rib portion receivable in said groove, and a pair of oppositely extending rims flexibly cantilevered from said rib portion, wherein each of said rims includes a retaining wall that is tapered between said rib portion and an outer edge of said retaining wall for engaging an outer edges of said lens wall in line contact such that said retaining walls of said rims flex toward with said outer lens wall in greater surface contact in response to momentary hoop stresses generated by shock to said lens.

6. The eyeglass frame according to claim 5, wherein said retaining walls of said rims are tapered at an angle of between about 10° and 20° relative to a line orthogonal to a central axis of said rib portion.

7. The eyeglass frame according to claim 6, wherein said retaining walls of said rims are tapered at an angle of between about 12° and 18° relative to a line orthogonal to a central axis of said rib portion.

8. The eyeglass frame according to claim 5, wherein said T-wire is formed from a resilient metal.

9. The eyeglass frame according to claim 5, wherein said rib portion has a rib that projects from said rims for a distance greater than said rims project from said rib portion.

10. The eyeglass frame according to claim 9, wherein said distance that said rib projects is less than a depth of said groove in said lens such that said rib does not come into contact with said groove when said retaining rims flex toward said outer lens walls.

11. The eyeglass frame according to claim 9, wherein said rib is defined by side walls that are tapered with respect to a central axis of said rib portion.

12. The eyeglass frame according to claim 11, wherein said rib side walls are tapered between about 5° and 7° with respect to said central axis.

13. The eyeglass frame according to claim 5, wherein a width of said T-wire is substantially equal to a width of said lens outer wall.

14. The eyeglass frame according to claim 5, wherein said lens is formed from safety lens material.

15. The eyeglass frame according to claim 14, wherein said material is polycarbonate.

16. The eyeglass frame according to claim 5, wherein said rims integrally adjoin said rib portion in a rounded joint to facilitate flexing.

* * * * *